United States Patent
Wostl et al.

[11] 3,786,421
[45] Jan. 15, 1974

[54] AUTOMATED DISPENSING SYSTEM

[75] Inventors: Wolfgang J. Wostl, South Holland; Bobby G. Gower, Park Forest, both of Ill.

[73] Assignee: Atlantic Richfield Company, New York, N.Y.

[22] Filed: May 25, 1972

[21] Appl. No.: 256,748

[52] U.S. Cl. ...... 340/149 A, 340/147 A, 235/61.7 B
[51] Int. Cl. .............................................. G06k 7/08
[58] Field of Search .................... 340/149 A, 152 R; 235/61.7 B

[56] References Cited
UNITED STATES PATENTS

| | | | |
|---|---|---|---|
| 3,629,834 | 12/1971 | Randall | 340/149 A |
| 3,624,360 | 11/1971 | Collier | 340/149 A X |
| 3,644,713 | 2/1972 | Hayakawa et al | 235/61.12 R X |
| 3,006,538 | 10/1961 | Deutsch | 340/147 A X |

*Primary Examiner*—Donald J. Yusko
*Attorney*—Morton, Bernard, Brown, Roberts & Sutherland

[57] ABSTRACT

An automated article dispensing system, such as a vehicle service station, capable of dispensing goods in response to activation by an authorized holder of a credit card, and not requiring an attendant. The customer inserts the credit card into a control console and the identifying indicia from the credit card are checked to ensure they correspond to a valid credit account. If so, the control console is enabled to permit the customer to select the goods desired. If desired, the system can also require the customer to insert a personal identification code which is checked to verify that the customer is an authorized user of the credit account. The sale price and quantity are applied by the control console to a data bank for billing and inventory. If the credit account is invalid, the credit card is captured by the control console. If the credit account is questionable, the credit card is returned without enabling the selection of goods. Means are included for ensuring that the customer does not forget to pick up his credit card and receipt. Means are also included to provide premiums such as trading stamps and premium tokens.

18 Claims, 14 Drawing Figures

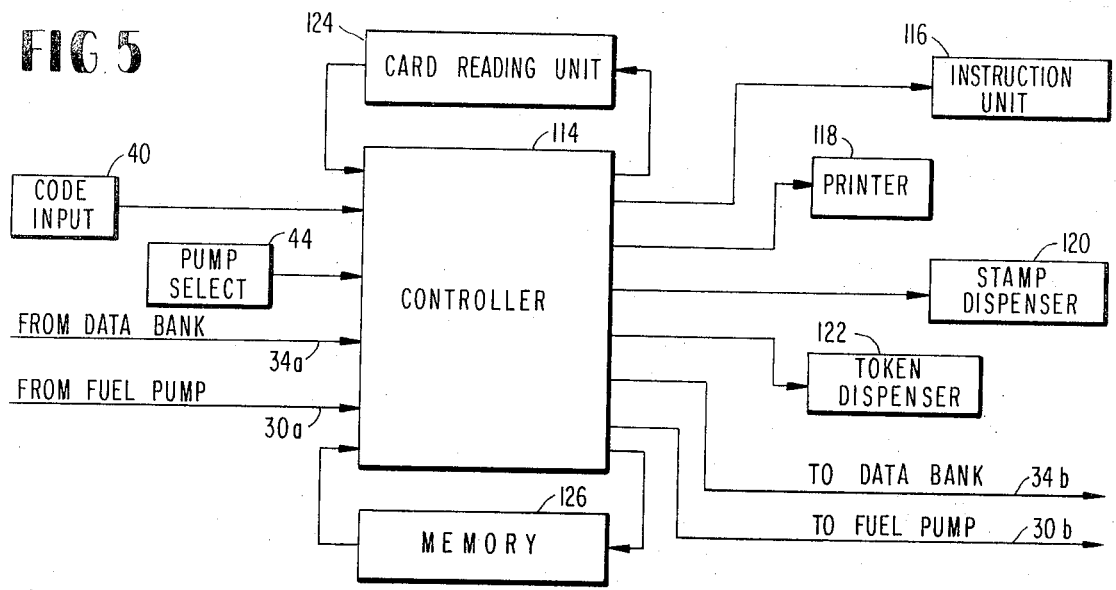
FIG. 5
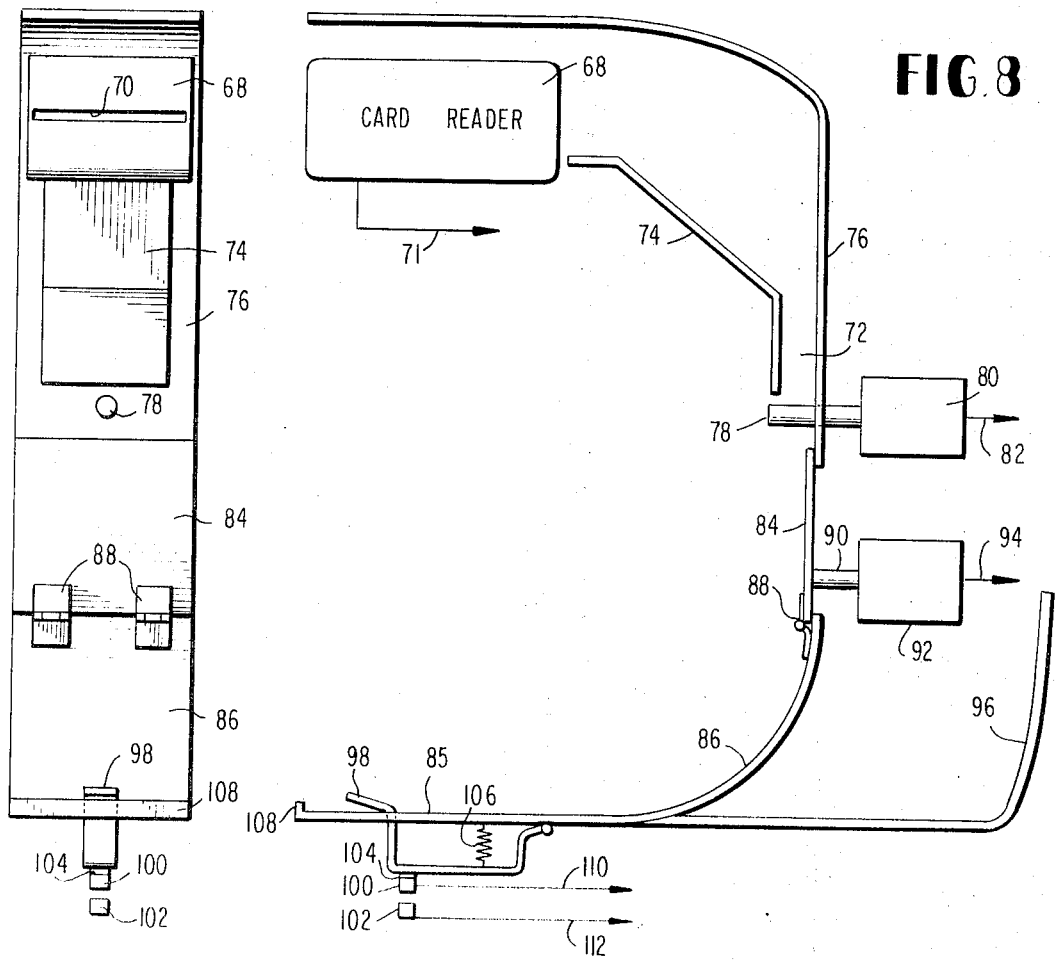
FIG. 7
FIG. 8

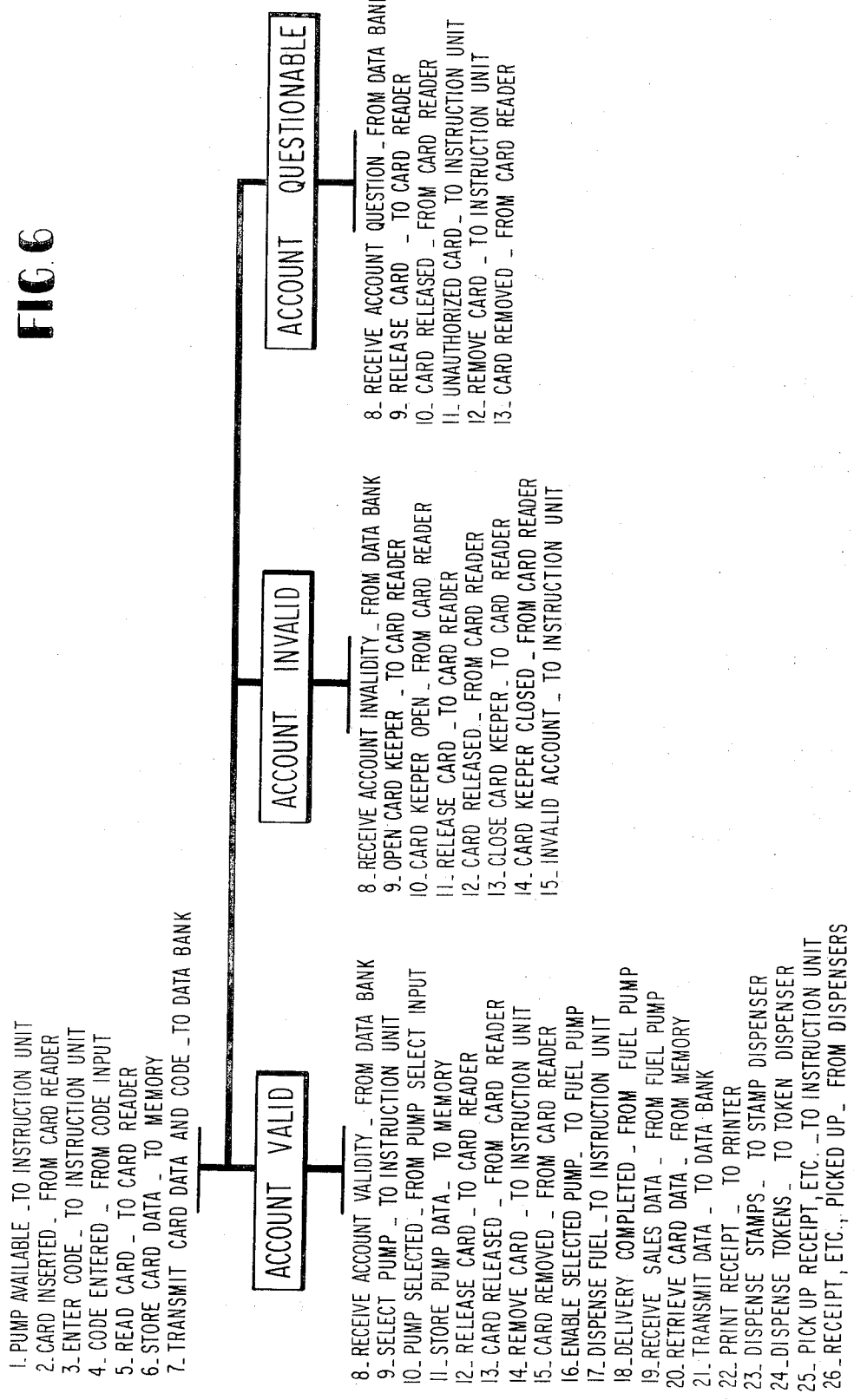

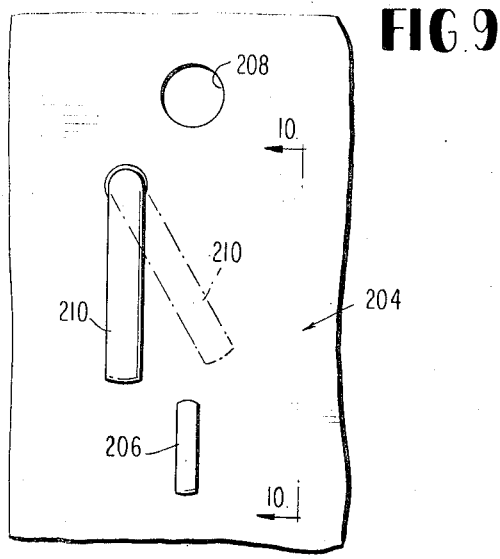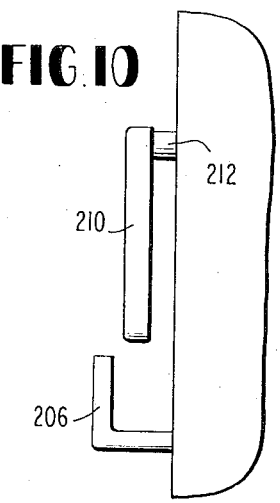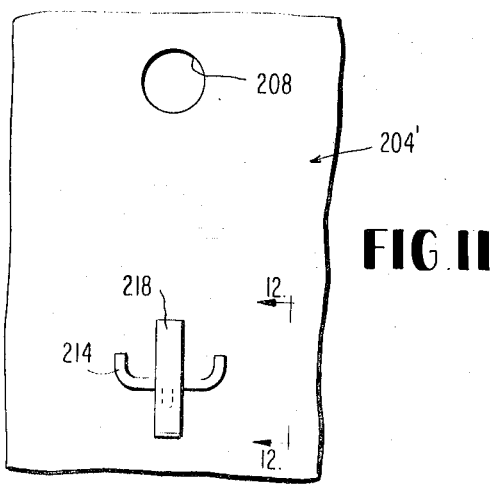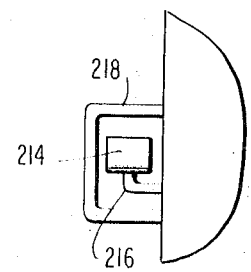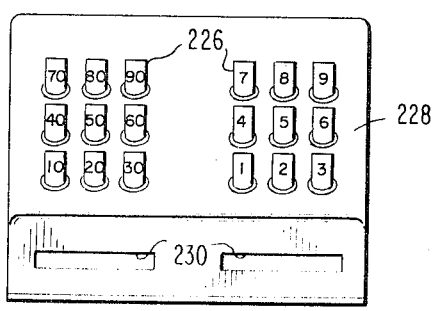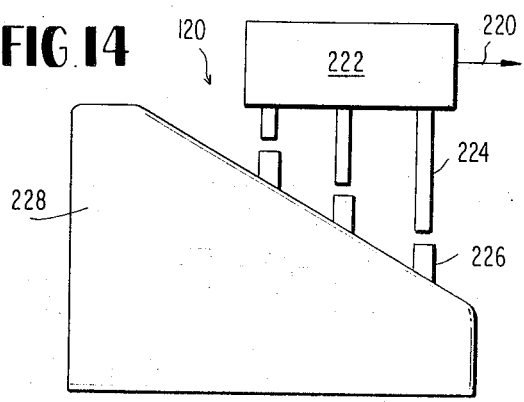

AUTOMATED DISPENSING SYSTEM

The present invention pertains to an automated system for dispensing goods. More particularly, the present invention pertains to a vehicle service station which is automated to dispense fuel, lubricant and other goods to customers without the necessity of an attendant at the service station.

The increasing number of motor vehicles in use results in an increasing requirement for service stations to provide such necessary items as fuel and lubricating oil for these motor vehicles. It is becoming increasingly difficult to secure sufficient personnel to operate such service stations. The routine operations, such as the supplying of fuel and lubricating oil, are generally within the skill of the average motorist even if he does not possess mechanical knowledge. The principal requirement for the station attendant is to handle the payment for the transaction. A large number of such transactions are paid for by utilizing a credit card issued by the company whose products are sold at the service station. It is desirable to have some service stations open during late night hours since there are motorists who require fuel and other items during such hours. Nevertheless, the number of such motorists is frequently so low that it is unprofitable to have personnel attending service stations during late night hours. In addition, if cash is kept in service stations during late night hours, robbery is invited, particularly in remote locations. Motorists on expressways generally are interested in obtaining required fuel and lubricating oil as rapidly as possible so as to minimize the amount of delay in their travel. Service stations on expressways have limited facilities and limited personnel. Often a vehicle that has been provided with fuel is kept waiting until a service station attendant can handle the payment for the transaction, and, again, this payment is often by means of a credit card. All these situations demonstrate the difficulties experienced by vehicle service stations which require the presence of an attendant to accomplish the transaction.

There has been developed apparatus for use with a fuel pump for receiving a customer's credit card and recording the data therefrom together with the sales data from the fuel pumps, thereby eliminating the requirement for an attendant. U.S. Pat. No. 3,184,714 discloses such apparatus. However, the apparatus there disclosed accommodates but one fuel pump. The card data and sales data are stored within the apparatus, thus requiring their transfer to other equipment for filling and inventory purposes. In addition, with that apparatus, a customer is likely to complete his transaction and leave without picking up his credit card or his receipt. U.S. Pat. No. 3,274,352 discloses apparatus for supplying bulk fuel to tank trucks. The delivery hose is inserted into a receiver on the tank truck, and a credit card is placed in a reader. When the cover of the reader is closed, fuel is delivered. Opening the cover stops delivery of the fuel. Billing data can be obtained by the reader.

The present invention is an automated system for dispensing articles in response to an approved credit card. The present invention is described herein in conjunction with a vehicle service station permitting the operator of a vehicle to obtain fuel and other supplies without the necessity of a service station attendant; however, the invention is equally suitable for the dispensing of other articles. In accordance with the present invention, an automated service station is provided with a control console into which the vehicle operator or customer inserts his credit card. Identifying indicia on the credit card are read, and signals indicative of those identifying indicia are transmitted to a data bank in which is stored credit information on holders of credit cards. If the credit card is approved, the data bank returns an approval signal permitting the control console to receive from the customer an indication of the fuel or other goods which he desires to obtain. The control console enables the dispensing device for the selected goods, and the customer then actuates the dispensing device himself to obtain the goods. Billing information, such as the unit price, quantity, and the total price of the goods, is applied from the dispensing device to the control console which transmits it to the data bank, enabling rapid billing and inventory control. If desired, the system can include identification means for the customer to provide a personal identification number verifying that he is the proper user of the credit card. Although the system is disclosed principally with reference to the dispensing of fuel for vehicles, other goods can be dispensed in accordance with the present invention. The system can incorporate means for retaining a credit card if the data bank indicates that it is from an invalid account. In addition, the system can incorporate means for dispensing premiums such as trading stamps and premium tokens entitling the customer to additional items at no cost.

These and other aspects and advantages of the present invention are more apparent in the following detailed description and claims, particularly when considered in conjunction with the accompanying drawings. In the drawings:

FIG. 5 is a block diagram of a control console suitable for use in the present invention;

FIG. 6 is a chart listing control commands and signals for operation of an automated article dispensing system in accordance with the present invention;

FIGS. 7 and 8 depict apparatus permitting the checking of the validity of a credit card in accordance with the present invention;

FIGS. 9, 10, 11 and 12 illustrate alternative embodiments of apparatus suitable for use as a portion of the control means incorporated in a system in accordance with the present invention; and FIGS. 13 and 14 illustrate means for dispensing premiums in accordance with the present invention.

Figure 1:
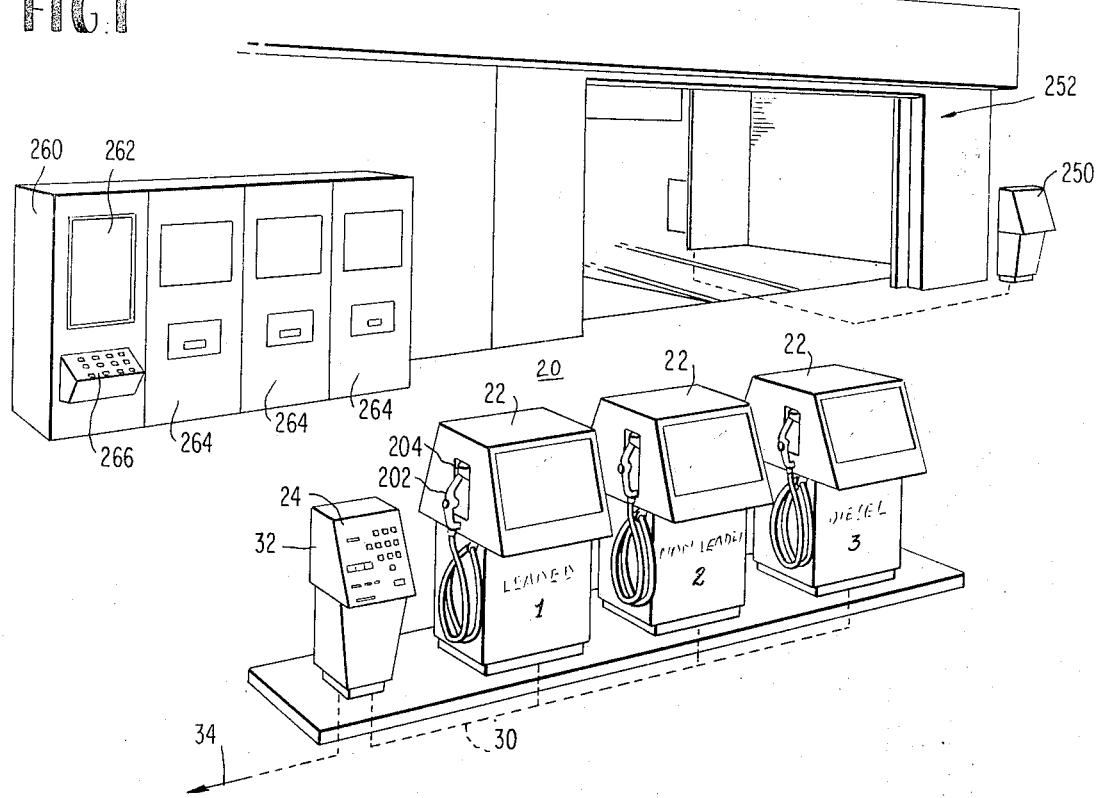
FIG. 1 is a schematic representation of a vehicle service station in accordance with the present invention.

FIG. 1 illustrates a vehicle service station 20 including a plurality of fuel pumps 22 which are connected by cable 30 to control console 32 to control the dispensing of fuel from the pumps. Control console 32 includes control panel 24 and is connected by cable 34 to a data bank for transmission and receipt of credit and sales information. The several fuel pumps 22 can be provided to dispense different types of fuel, for example leaded gasoline, non-leaded gasoline and diesel fuel, respectively.

Figure 2:
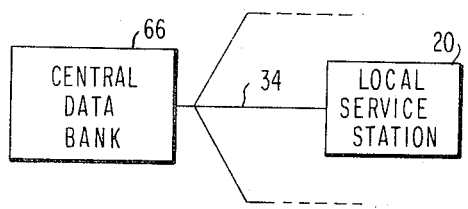
FIG. 2 is a block diagram depicting connection of a vehicle service station to a central data bank in accordance with the present invention.

As illustrated in FIG. 2, the data bank to which service station 20 is connected by cable 34 can be a remotely located centralized data processor or data bank 66 having a plurality of local service stations 20 connected thereto, for example on a shared-time basis. Alternatively, the data bank can be local to a service station 20, handling transactions only at that station. By way of illustration, whether local or central, the data bank could be a properly programmed digital computer.

Figure 3:
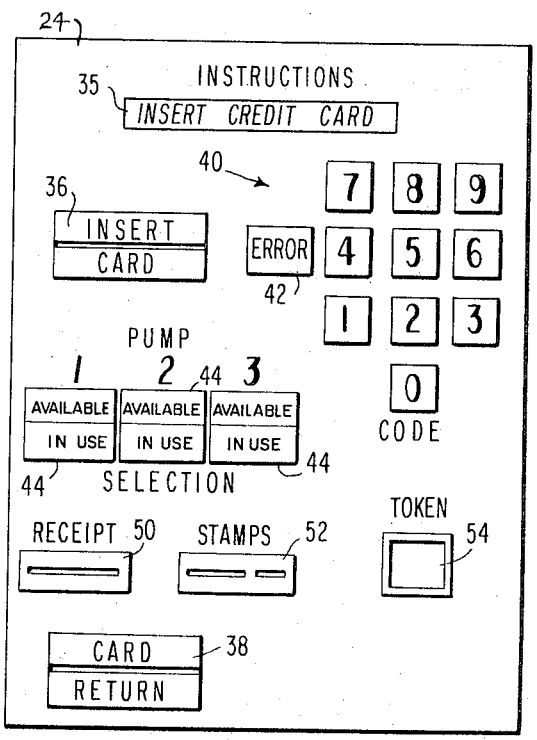
FIG. 3 depicts a control panel suitable for use on a control console in a service station in accordance with the present invention.

FIG. 3 illustrates a control panel 24 suitable for incorporation into control console 32. Display area 35 provides operating instruction messages to customers wishing to obtain fuel from service station 20. By way of illustration, these messages can be printed on the surface of a rotating cylinder within control console 32, and a suitable control can be provided to align the appropriate message with display area 35. Control console 32 further includes a card receiver having a card receiver inlet 36 into which the customer inserts his credit card. After the validity of the credit card has been determined, the credit card is returned to the customer through the card receiver outlet or card return 38. Control console 32 further includes coded input buttons 40. As illustrated in FIG. 3, there can be provided ten coded input buttons designated from 0 through 9 by means of which the customer can enter a security code or personal identification code indication verifying his authority to use the credit card he has inserted into card receiver 36, together with an error correction button 42 which permits the customer to erase a personal identification code portion which he has inserted in the event he realizes he has made an error. The personal identification code indication generated by the customer is compared within the system with an identification code indication assigned the customer. If this comparison is proper, the system is enabled to proceed with the transaction. If the comparison is improper, completion of the transaction is inhibited.

Control console 32 is provided with a plurality fuel pump selection buttons 44, there being one fuel pump selection button 44 for each fuel pump 22 to enable the customer to select the pump having the fuel he desires. Preferably, the fuel pump selection buttons 44 are two-state actuator/indicators. Thus, if a fuel pump 22 is available for use, its corresponding button 44 lights an "Available" indication. When a customer selects a pump by actuating its selection button 44, that button enables the selected pump to provide fuel and changes its illuminated indication to read "In Use" to indicate that the associated pump is not then available for a new customer. Control console 32 further includes receipt dispenser 50 to provide the customer with a receipt for the fuel he has obtained. If desired, control console 32 can also include dispensers for premiums such as stamp dispensing chute 52 to dispense trading stamps for the amount of a purchase and token dispensing chute 54 to dispense tokens entitling the customer to additional items if the purchase is at least a preset minimum amount.

Figure 4:
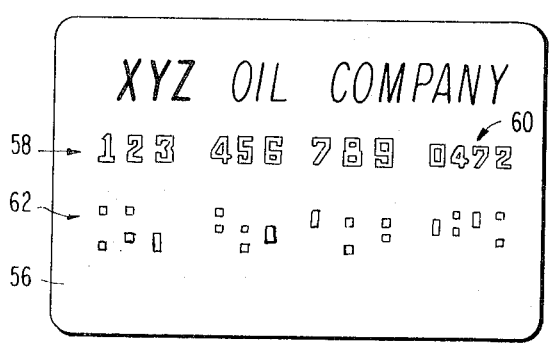
FIG. 4 depicts a credit card suitable for use in the present invention.

FIG. 4 illustrates a typical credit card 56 of a type which might be utilized in conjunction with an article dispenser in accordance with the present invention. Credit card 56 includes identifying indicia 58, for example a credit card account number. These indicia identify the account number of the card holder within the issuing company and, for example, can be embossed on credit card 56, as illustrated in FIG. 4. Preferably, also the indicia 58, in cooperation with their placement on card 56, identify the issuing company. Thus, for example, one series of account numbers can be assigned to each company which might issue credit cards. Alternatively, the grouping of the indicia 58 on credit card 56 can identify the issuing company. Thus, for example, FIG. 4 illustrates a total of nine indicia 58 in groups of three indicia with a space between each group. Another issuing company might have one group of two indicia, one group of three indicia, and one group of four indicia. Other groupings can identify other issuing companies. The size of the spacing between groups of indicia can further be used to identify an issuing company. If desired, fewer or more than nine indicia can be included on the card, of course. In addition to the identifying indicia 58, credit card 56 can include indicia 60 showing the expiration date of the card. Preferably, the expiration dated indicia 60 are aligned horizontally with identifying indicia 58. The indicia 58 and 60 can be provided only in arabic numerals if desired. Alternatively, the indicia 58 and 60 can be provided in a binary coded decimal format 62 or in both arabic numerals and the binary coded decimal format.

FIG. 5 is a block diagram of apparatus suitable for use as control console 32. Within the control console 32, controller 114 receives input signals from the customer-operated controls on control panel 24 and from other control equipment which indicate the state of the system components and provides output signals to other operating equipment and to dispensing devices which dispense through control panel 24. Thus, controller 114 receives the customer personal identification code input signals from code input buttons 40 and the fuel pump selection signal from fuel pump selection buttons 44. Additionally, controller 114 is connected by cable 30a, within cable 30, to receive signals from fuel pumps 22 and by cable 34a, within cable 34, to receive signals from data bank 66. Controller 114 provides output signals to instruction unit 116, causing unit 116 to provide the desired instruction signals or messages at display 35 on control panel 24. Likewise, controller 114 provides signals to printer 118 which prepares the receipt that is issued through receipt dispenser 50. If desired to provide customers with premiums such as trading stamps or tokens, then controller 114 provides outputs to stamp dispenser 120 and token dispenser 122 to activate these components. Controller 114 is also coupled by cable 34b of cable 34 to data bank 66 and by cable 30b of cable 30 to fuel pumps 22.

Control console 32 further includes card reading unit 124 which receives signals from and provides signals to controller 114 and which reads the identifying indicia from the customer's credit card. In addition, control console 32 includes memory 126 which is coupled to controller 114 for passage of signals therebetween and which provides interim local storage of data within control console 32.

FIG. 6 is a chart listing control commands and signals transmitted in the operation of the automated service station 20 in accordance with the present invention. When the service station is in its quiescent condition and available for use, controller 114 provides a Pump Available signal to instruction unit 116. This causes instruction unit 116 to provide at display 35 a message such as "Insert Credit Card" or "All Pumps Available." When a customer inserts his credit card 56 into card receiver 36, card reading unit 124 provides a Card Inserted signal to controller 114. In response, controller 114 applies to instruction unit 116 an Enter Code command, causing instruction unit 116 to provide at display 35 a message such as "Enter Personal Identification Code." This instructs the customer to enter his security code at security code input buttons 40. When this has been done, a Code Entered signal is provided from code input buttons 40 to controller 114. Controller 114 stores that code in memory 126 and applies a Read Card signal to card reading unit 124, causing the card reading unit to read the identifying indicia 58 from the customer's credit card 56. This card data is applied by card reading unit 124 to controller 114 which passes the card data to memory 126 for storage. Controller 114 retrieves the security code from memory 126 and transmits the card data and the security code to data bank 66 for a check of the validity of the credit account. The expiration date indicia 60 on card 56 can be checked either by data bank 66 or by controller 114 to ensure the card is unexpired.

Data bank 66 has stored within it credit card validation data from which the validity of accounts can be determined. By way of example, if data bank 66 is a centralized data bank serving a plurality of service stations 20 from a remote location, then data bank 66 may store each account number and the corresponding security code, together with an indication of whether the account is valid or invalid. Alternatively, the security code can be a number derived by performing an algorithm on the account number, in which event data bank 66 might store only invalid account numbers and the algorithm. If data bank 66 is local to service station 20, then preferably the security code is derived by performing an algorithm on the identifying indicia so that a large number of security codes need not be stored at each local service station. Preferably, too, in such situation the data bank 66 stores invalid account numbers or numbers of invalid accounts which it is expected might be used in the locality of the particular service station 20, thereby reducing the memory requirement. Alternatively, of course, the screening of invalid accounts can be omitted if data bank 66 is local to the service station, with unauthorized purchases screened only by use of a security code derived by performing an algorithm on the identifying indicia 58. As an additional alternative, the security code and coded input buttons 40 can be omitted if data bank 66 stores credit card validation signals, so that any customer presenting a valid credit card is assumed to be an authorized purchaser.

Data bank 66 returns to controller 114 a credit card validation indication signal indicative of the credit card validity state. If data bank 66 determines that the account is valid, then the data bank returns to controller 114 signals enabling the completion of the transaction. If data bank 66 determines that the account is invalid, then the data bank returns to controller 114 signals causing control console 32 to capture the credit card 56 and to prevent completion of the transaction. If data bank 66 is unable to determine the validity of the account, the data bank returns to controller 114 signals causing control console 32 to return the credit card 56 through card return 38 but preventing completion of the transaction. Such situation might exist if data bank 66 is unable to identify the credit card 56 as a credit card honored by the company operating service station 20.

When a valid account signal is received from data bank 66, controller 114 transmits a Select Pump command to instruction unit 116, causing the instruction unit to provide at display 35 a "Select Pump" message. The customer then actuates the fuel pump selection button 44 corresponding with the pump 22 which he desires to use, and a signal identifying the selected pump is supplied from that fuel pump selection button 44 to controller 114. This pump data is then stored in memory 126, together with the previously stored card data. Controller 114 then applies a Release Card command to card reading unit 124, causing the card reading unit to release the customer's credit card. The credit card is then available to the customer at card return 38, and card reading unit 124 applies a Card Released signal to controller 114, which then sends a Remove Card command to instruction unit 116. In response, instruction unit 116 provides at display 35 a "Remove Card" message. When the customer has removed his card from card return 38, card reading unit 124 sends a Card Removed signal to controller 114, and controller 114 then provides an enabling signal to the selected fuel pump, enabling that pump to operate. In addition, controller 114 sends a Dispense Fuel message to instruction unit 116, causing the instruction unit 116 to provide at display 35 a "Dispense Fuel" message. The customer can then remove the nozzle 202 from the nozzle holder 204 of the selected fuel pump 22 to obtain the desired quantity of fuel. Since the selected fuel pump is not enabled to dispense fuel until after the card is removed from card return 38, the customer is unlikely to leave his credit card behind when he leaves service station 20. When the customer has obtained his fuel and returned the nozzle 202 to nozzle holder 204, the fuel pump 22 transmits a Delivery Completed signal to controller 114, together with sales data such as the quantity of fuel delivered and the price for that fuel. Controller 114 then retrieves from memory 126 the card data corresponding with that fuel pump 22 and transmits to data bank 66 the card data and the sales data. This permits data bank 66 to accomplish billing and inventory. If data bank 66 is a centralized remote data bank accommodating all service stations authorized to accept a particular credit card, the immediate transmittal of the sales and card data to the data bank permits rapid billing and inventory control. Thus, little delay is experienced in billing for credit purchases no matter how remote the purchase location may be from the customer's home. Transmittal of the sales and card data electronically to data bank 66 also eliminates the requirement for manual insertion of data and manual sorting of sales slips or receipts. Data bank 66 can thus generate a descriptive bill for each customer, printing on the bill the identification of the particular service station 20 at which each purchase was made, the date of each purchase, the quantity, unit price and total price of the goods purchased. There is then no necessity to sort the printed copies of the receipts retained at service station 20, and so these copies need not be retained except as back up documents should data source 66 or cable 34 fail. The immediate supplying of sales data to data bank 66 also permits a ready record to be maintained of current inventory levels at each service station 20 to ensure no shortage of fuel or other goods.

Controller 114 also applies the card data and sales data to printer 118, causing the printer to print a receipt which is issued at receipt dispenser 50. In addition, if desired, controller 114 provides to stamp dispenser 120 signals causing the issuance through stamp dispensing chute 52 of the appropriate quantity of trading stamps. Likewise, if desired, controller 114 determines whether the sale has met the required minimum amount and if so applies to token dispenser 122 a signal causing the issuance through token dispensing chute 54 of premium tokens. Controller 114 then sends to instruction unit 116 a Pick Up Receipt signal, causing the instruction unit to provide at display 35 a "Pick Up Receipt" message. If desired, this signal can also actuate additional indicators to insure that the customer does not forget to pick up his receipt and premiums. Thus, for example, this signal can actuate a light or a bell unitl such time as the receipt and premiums are removed and the system returned to the quiescent condition.

Once one pump has been enabled to dispense fuel and the customer has actuated its nozzle, the system can accept another credit card from a customer desiring to obtain fuel from a different pump. Thus when the first customer has commenced dispensing his fuel by removing the appropriate nozzle 202 from its nozzle holder 204, controller 114 can cause instruction unit 116 to provide the "Insert Credit Card" message at display 35. Memory 126 associates each credit card identification number with the pump being utilized by the customer with that card, and the actuator/indicators of fuel pump selection buttons 44 inform the subsequent customer whether the fuel pump he desires to use is available. Thus, it is not necessary for the first customer to complete his transaction before the next customer begins.

In the event data bank 66 provides to controller 114 a signal indicating that the credit account is invalid, controller 114 applies to card reading unit 124 a signal causing the card reading unit to actuate its card keeper. When the card keeper is opened, card reading unit 124 so indicates to controller 114, and controller 114 then sends a Release Card signal to card reading unit 124.

Receipt by controller 114 of the Card Released signal from card reading unit 124 causes controller 114 to apply to card reading unit 124 a command to close the card keeper. Once this is accomplished, card reading unit 124 sends a Card Keeper Closed signal to controller 114, and the controller transmits an Invalid Account signal to instruction unit 116, causing the instruction unit to provide at display 35 a message indicating that the card has been retained and that the transaction cannot be completed because the account is invalid. Alternatively, this same message can be given the customer in printed form on a paper issued through receipt dispenser 50. The system then returns to its quiescent condition.

If data bank 66 sends to control console 32 a signal indicating that the authenticity of the account is questionable, controller 114 sends to card reading unit 124 a Release Card command, causing the card reading unit to release the card to card return 38. WWhen controller 114 has received from card reading unit 124 a signal that the card has been released, controller 114 applies to instruction unit 116 signals causing the instruction unit to provide at display 35 messages indicating that the transaction cannot be completed because the account is questionable and that the customer should remove the card from card return 38. Again, as an alternative, that message can be given the customer in printed form on a paper issued through receipt dispenser 50. Once the card is removed, card reading unit 124 provides a Card Removed signal to controller 114, returning the system to its quiescent condition.

A credit account may be considered invalid because the credit card associated with it has been reported lost or stolen or because of an overdue balance. Data bank 66 might also be programmed to consider the account invalid and therefore to capture the credit card if the personal identification code entered at code input buttons 40 is not correct. Alternatively in such situation data bank 66 can generate a signal indicating that the authenticity of the account is questionable, causing the credit card to be returned but not permitting the transaction to be completed. If desired, when an incorrect personal identification code is entered, data bank 66 can send to controller 114 a signal instructing controller 114 to cause instruction unit 116 to display an Enter Code Again message. This would permit the customer another opportunity to enter the correct code. If the customer did not enter the correct code, say on his second or third try, the account would be considered invalid or questionable because the customer was unable to show his authenticity or authority to use the account.

The above description of operation is, of course, only a general outline. Some steps might be performed in a different order, or some steps might be consolidated or eliminated, but the above description sets out the general operation. Preferably, controller 114 includes timing circuitry which releases the credit card 56 and returns the system to the quiescent condition if a preset time interval elapses without the appropriate action by the customer.

The several components of FIG. 5 making up control console 32 might each be any of a number of alternatives. Controller 114, by way of examples, could be an appropriately programmed general purpose computer or a specially designed controller capable of sensing receipt of the various input signals and the various signals indicating the state of the system components and of generating in response thereto the necessary commands. Memory 126 can be any alterable memory device capable of storage of data such as a small magnetic core memory, magnetic disc memory, etc.

FIGS. 7 and 8 illustrate apparatus suitable for use as card reading unit 124. Card reader 68 is positioned within control console 32 with its inlet 70 immediately behind card receiver 36 so that when a customer inserts his credit card 56 into receiver 36, the credit card passes through inlet 70 into card reader 68. Card reader 68 reads the indicia on credit card 56 and transmits via cable 71 to controller 124 data signals indicative of the identifying indicia 58 and the expiration date indicia 60. From card reader 68 credit card 56 passes between upper frame member 76 and guide 74 to retention zone 72. Solenoid 80 in its quiescent condition maintains retention pin 78 across the discharge of retention zone 72 to retain credit card 56 in zone 72 after passage from card reader 68. Solenoid 80 is connected by cable 82 to controller 124. Card keeper 84 is connected to lower frame member 86 by hinge 88 and extends between lower frame member 86 and upper frame member 76. Pin 90 of solenoid 92 is connected to card keeper 84, and in the quiescent condition of solenoid 92, card keeper 84 is closed, as depicted in FIG. 8. Solenoid 92 is connected to controller 124 by cable 94.

The identifying indicia of a credit card 56 inserted within card reader 68 are transmitted by cable 71 to controller 124. The card 56 then moves into retention zone 72, coming to rest against pin 78. Controller 124 then transmits the card data to data bank 66 to determine the validity of the credit account. If data bank 66 returns a valid account signal to control console 32, controller 124 instructs the customer to select the desired fuel pump 22. Once the pump has been selected and the pump data and card data stored in memory 126, controller 114 sends the Release Card command to card reading unit 124. This command is applied by line 82 to solenoid 80. Actuation of solenoid 80 retracts pin 78, permitting credit card 56 to move from retention zone 72 to card return zone 85 on lower frame member 86. The credit card comes to rest on limit switch 98, depressing the limit switch to close contact 100 against contact 102. Preferably, contact 100 is separated from limit switch 98 by electrically insulating member 104. Preferably, also, lower frame member 86 terminates in a slightly upturned lip 108 to prevent credit card 56 from falling from the end of lower frame member 86. Closure of contact 100 against contact 102 provides electrical continuity between lines 110 and 112, transmitting the Card Released signal to controller 114. Lip 108 is adjacent card return 38 on control panel 24. When the customer removes his credit card from card return 38, spring 106 returns limit switch 98 to its quiescent position, disengaging contact 100 from contact 102. Interruption of the electrical continuity between lines 110 and 112 transmits the Card Released signal to controller 114.

If data bank 66 returns a signal indicating that the credit card is associated with an invalid account, controller 114 applies a signal via line 94 to solenoid 92, causing that solenoid to extend pin 90, opening card keeper 84. Controller 114 then applies a signal to solenoid 80, causing pin 78 to withdraw. The credit card then moves from retention zone defined by frame member 96. Solenoids 80 and 92 are then deactivated, returning retention pin 80 across retention zone 72 and closing card keeper 84. If desired limit switches can be incorporated to indicate to controller 114 the opening of card keeper 84, the release of the card from retention zone 72, and the closing of card keeper 84. Alternatively, these actions can be assumed after appropriate time delays.

Should data bank 66 return to controller 114 a signal indicating that data bank 66 is unable to determine the validity of the credit card, controller 114 actuates solenoid 80 to retract pin 78, releasing the credit card to card return zone 85, but the system is not enabled to dispense fuel.

Card reader 68 can be any device capable of sensing the indicia on card 56. The indicia may be embossed, as depicted in FIG. 4, or magnetically encoded or encoded by other means on card 56, and card reader 68 must be capable of sensing the indicia as encoded. Thus, the credit card 56 and card reader 68 must be compatible. If embossed indicia are utilized, as in FIG. 4, card reader 68 can be of the type disclosed in U.S. Pat. No. 3,627,991. Apparatus for verifying a customer's authority to use a credit card by comparing a security code inserted by the customer with a number derived by performing an algorithm on the credit card account number is shown in U.S. Pat. Nos. 3,401,830 and 3,513,298. Apparatus for sensing magnetically encoded indicia in a credit card and comparing a security code is shown in U.S. Pat. Nos. 3,430,200; 3,453,598; and 3,643,064. The apparatus of any of the above patents can be adapted for use in an automated article dispensing system in accordance with the present invention.

If desired, cards can be provided, either from an attendant or from a cash-actuated dispenser, to permit operation of the dispensing system by cash customers who do not have an authorized credit card. By way of example, such a cash card can be magnetically encoded to indicate that it is a cash card of a certain value. Then, if the customer purchases less than that value, card reader 124 can include means for altering the magnetic encoding to show the remaining value. If an embossed cash card is utilized, any remaining value can be printed on the receipt for subsequent use or refund at a service station having an attendant or having a reader for the printed value. Likewise, credit cards, either embossed or magnetic, can be encoded to indicate that they are limited to use for transactions only up to a certain credit limit such as five dollars.

To ensure accurate billing and inventory control, the sales data from the previous customer must be reset on fuel pump 22 before delivery of fuel to a new customer commences. FIGS. 9 and 10 illustrate a known type of fuel pump control for resetting the sales data of a fuel pump 22. Nozzle holder 204 includes support member 206, on which the handle of nozzle 202 rests, and opening 208 into which the discharge spout of the nozzle 202 is inserted. Lever 210 is rotatably supported from pump 22 by rod 212. As lever 210 is rotated from the solid-line position of FIG. 9 to the broken-line position, rod 212 actuates equipment within fuel pump 22 to reset the price and quantity indicators and to turn on the fuel pump, enabling it to deliver fuel. Thus, to deliver fuel to his vehicle the vehicle operator removes nozzle 202 from holder 204, inserts the nozzle discharge spout into the fuel tank filler pipe inlet of his vehicle, rotates lever 210 from the solid-line position of FIG. 9 to the broken-line position, and actuates the nozzle control. Since nozzle 202 cannot be returned to its rest position when lever 210 is in the broken-line position, the price and quantity indicators are reset between customers.

FIGS. 11 and 12 illustrate an alternative apparatus for resetting the price and quantity indicators and enabling the fuel pump upon removal of nozzle 202 from holder 204. Nozzle holder 204' of FIGS. 11 and 12 includes stabilizing bar 218 and horizontal support member 214 which is coupled by rod 216 to equipment within fuel pump 22 to permit limited vertical rotation of support member 214. Within fuel pump 22 rod 216 is biased to urge it to rotate upwardly. When nozzle 202 is placed in its rest position with the nozzle handle on horizontal support member 214, rod 216 is rotated downwardly against this bias. Consequently, when nozzle 202 is removed from nozzle support area 204, rod 216 rotates upwardly, resetting the price and quantity indicators and enabling the fuel pump to deliver fuel in response to movement of the control within the nozzle.

As an additional alternative, the price and quantity indicators of fuel pump 22 can be reset when the associated fuel pump selection button 44 on control panel 24 is actuated.

Once the customer has inserted nozzle 202 into the fuel tank filler pipe inlet on his vehicle and has reset the price and quantity indicators, he actuates the nozzle to deliver the desired quantity of fuel. The fuel pump monitors the quantity and price as the fuel is delivered and supplies the sales data to control console 32. When the fuel delivery has been completed and nozzle 202 has been returned to nozzle holder 204, controller 114 merges the sales data with the stored credit card data from the customer's credit card and applies that information to data processor 66 and to printer 118 which prints a receipt. The receipt is then issued through receipt dispenser 50.

Instruction unit 116, for example, might be a stepping switch having its rotary arm connected to a cylinder on the outer cylindrical surface of which the desired messages are printed so that commands from controller 114 bring the stepping switch to a position in which the desired message is aligned for viewing at display area 35 on control panel 24. Printer 118 can be a solenoid-operated printer capable of printing the card and sales data on a pre-designed form receipt. Preferably, printer 118 prepares receipts in duplicate, with one copy supplied to the customer through receipt dispenser 50 and one copy retained within control console 32. Preferably, also, the receipts are printed in machine-readable format so that should data bank 66 be inoperative to receive the sales and card data for billing and inventory, the sales and card data can be automatically read from the receipt copies retained in control console 32 to permit rapid billing. Alternatively, in such situation the sales and card data can be recorded on, for example, magnetic tape as the receipt is printed and subsequently read at high speed for billing.

If it is desired to dispense premium trading stamps with each sale, control console 32 includes stamp dispenser 120 which is actuated by controller 114 after the sales data are received from fuel pump 22. FIGS. 13 and 14 depict a stamp dispenser 120 suitable for this purpose. When the sales data are known, controller 114 applies actuating signals via cable 220 to solenoids 222 which control rods 224 positioned adjacent the control push-buttons 226 of stamp dispensing machine 228. In response to actuation of the control pushbuttons 226, stamp dispensing machine 228 dispenses stamps through its outlets 230 which are aligned adjacent stamp dispensing chutes 52 on control panel 24.

Similarly, if it is desired to dispense premium tokens for purchases of at least a certain minimum amount, control console 32 includes token dispenser 122 which can be a solenoid-operated dispensing device. In such event, if the total price or quantity are at least the required minimum amount, controller 114 applies an enabling signal to token dispenser 122 which issues a token through token dispensing chute 54 on control panel 24. By way of example, such a token can permit the vehicle operator to obtain a free car wash. Thus, as depicted in FIG. 1, the token might be inserted into receiver 250 at service station 20 to actuate car wash 252 through which the customer then drives his vehicle so that the vehicle exterior is washed. Alternatively, rather than dispensing a token, if the purchase is at least the minimum amount the receipt provided the customer can include a coded indication in a machine readable print, in which event the customer inserts the receipt into receiver 250 to actuate car wash 252, and on actuating the car wash receiver 250 alters the receipt to prevent reuse.

Service station 20 can further include dispensing unit 260 incorporating a control console 262 and article dispensing areas 264. Control console 262 can be similar to control console 32 with the selection controls 44 actuating the various article dispensing areas 264 rather than actuating fuel pumps. By way of examples, dispensing unit 260 can be equipped to dispense articles related to the motor vehicle such as lubricating oil, tires, batteries or other accessories. Further, it can be equipped to dispense other items such as newspapers and staple foods, for example bread, canned or bottled food and beverages, candy, and dried cereals.

If it is desired, the automated system can permit billing for services or for goods which are provided by an attendant. Thus, for example, the service station might be manned by one or more attendants who are available for such things as changing tires, installing equipment, etc. In such event data for the charges for such things are applied to electronic cash register 266 which is coupled via cable 34 to data bank 66 for the immediate billing and inventory control related to such items.

Although the present invention has been disclosed with reference to preferred embodiments, numerous modifications could be made, and still the result would be within the scope of the invention.

What is claimed is:

1. A system for dispensing goods to customers comprising:
    a. a plurality of dispensing means, each including enabling means, first control means, and outlet means; each said dispensing means, in response to actuation of its said first control means during application of an enabling signal to its said enabling means, continuously dispensing a quantity of goods and generating at least one of a quantity signal, indicative of the quantity of the goods dispensed, and a value signal, indicative of the value of the goods dispensed;
    b. card receiver means including means for receiving a credit card, means for identifying indicia on the credit card, means for generating an output signal indicative of such indicia, means releasing the credit card, and means for generating a card removed signal upon removal of the credit card from the card receiver means;
    c. selection means responsive to selection by a customer of one of said plurality of dispensing means for generating a selection signal indicative of the selected one of the plurality of dispensing means;
    d. additional control means associated with said dispensing means, said selection means, and said card receiver means, said additional control means, upon generation of a card receiver means output signal, a selection signal, and a card removed signal, applying to the enabling means of the one of said plurality of dispensing means indicated by the selection signal an enabling signal to enable said one of the plurality of dispensing means to dispense goods; and
    e. data transmission means associated with said plurality of dispensing means, said card receiver means, said selection means, and said additional control means and adapted for connection to a data bank for transmitting to the data bank signals indicative of the selected one of the plurality of dispensing means, of the identifying indicia, and of the at least one of the quantity signal and the value signal.

2. An automated system as claimed in claim 1 in which said plurality of dispensing means include at least one fuel pump.

3. An automated system as claimed in claim 1 in which said additional control means includes means for receiving a security code indication generated by a customer, means for providing a security indication signal in response to comparison of a received security code indication with a customer code indication, the security indication signal being indicative of the validity state of the received security code indication, and means responsive to a security indication signal indicative of a first security code indication validity state for generating the enabling signal.

4. An automated system as claimed in claim 3 in which said additional control means further includes means responsive to a security indication signal indicative of a second security code indication validity state for inhibiting generation of the enabling signal.

5. An automated system as claimed in claim 3 in which said additional control means further includes means for generating the customer code indication by performing an algorithm on identifying indicia on a credit card within said card receiver means.

6. An automated system as claimed in claim 1 in which said additional control means includes:
1. a data bank connected to said data transmission means and having:
 a. means for storing credit card validation signals;
 b. means for receiving from said data transmission means data signals indicative of credit card identifying indicia;
 c. means for comparing received data signals with stored credit card validation signals to determine the comparison state therebetween; and
 d. means for generating in response to a first comparison state between received data signals and stored credit card validation signals a validation indication signal indicative of a first credit card validity state for a credit card identified by received data signals; and
2. means responsive to a validation indication signal indicative of the first credit card validity state for generating the enabling signal.

7. An automated system as claimed in claim 6 in which said additional control means further includes means responsive to a validation indication signal indicative of a second credit card validity state for inhibiting generation of the enabling signal.

8. An automated system as claimed in claim 7 in which said additional control means further includes means responsive to a validation indication signal indicative of the second credit card validity state for inhibiting release of the credit card to the card receiver means outlet.

9. An automated system as claimed in claim 6 in which said data bank is a remotely located centralized data processing system and in which said data transmission means includes cable means connecting at least one of said additional control means, said selection means, said plurality of dispensing means, and said card receiver means to said remotely located centralized data processing system.

10. An automated system as claimed in claim 1 in which said additional control means includes sensing means for sensing the state of said system and instruction means responsive to said sensing means for providing instructional messages to customers.

11. An automated system as claimed in claim 1 further comprising premium dispensing means coupled to said additional control means and responsive to a signal indicative of the at least one of the quantity signal and the value signal being of at least a preset amount for dispensing premiums.

12. An automated system as claimed in claim 11 in which said premium dispensing means includes a premium stamp dispenser and means responsive to the at least one of the quantity signal and the value signal for actuating said premium stamp dispenser to dispense premium stamps.

13. An automated system as claimed in claim 11 in which said premium dispensing means includes a premium token dispenser for dispensing a premium token in response to the at least one of the quantity signal and the value signal being indicative of at least a preset amount.

14. A system for dispensing fuel to customers comprising:
a. fuel pump means, including enabling means, first control means, and outlet means; said fuel pump means, in response to actuation of said first control means during application of an enabling signal to said enabling means, continuously dispensing fuel and generating at least one of a quantity signal, indicative of the quantity of fuel dispensed, and a value signal, indicative of the value of fuel dispensed;
b. card receiver means including means for receiving a credit card, means for identifying indicia on the credit card, means for generating an output signal indicative of such indicia, means releasing the credit card, and means for generating a card removed signal upon removal of the credit card from the card receiver means;
c. additional control means associated with said dispensing means and said card receiver means, said additional control means, upon generation of a card receiver means output signal and a card removed signal, applying to the enabling means of said fuel pump means an enabling signal to enable said fuel pump means to dispense fuel; and
d. data transmission means associated with said fuel pump means, said card receiver means, and said additional control means and adapted for connection to a data bank for transmitting to the data bank signals indicative of the identifying indicia and of the at least one of the quantity signal and the value signal.

15. An automated system as claimed in claim 14 in which said additional control means includes means for receiving a security code indication generated by a customer, means for providing a security indication signal in response to comparison of a received security code indication with a customer code indication, the security indication signal being indicative of the validity state of the received security code indication, means responsive to a security indication signal indicative of a first security code indication validity state for generating the enabling signal, and means responsive to a security indication signal indicative of a second security code indication validity state for inhibiting generation of the enabling signal.

16. An automated system as claimed in claim 15 in which said additional control means further includes means for generating the customer code indication by performing an algorithm on identifying indicia on a credit card within said card receiver means.

17. An automated system as claimed in claim 15 in which said additional control means further includes means responsive to a security indication signal indicative of the second security code indication validity state for inhibiting release of the credit card to the card receiver means outlet.

18. An automated system as claimed in claim 14 in which said plurality of dispensing means include at least one fuel pump.

* * * * *